Dec. 6, 1966 S. J. HUNT ETAL 3,289,356
WORK LOCATING MEANS
Filed July 20, 1964 3 Sheets-Sheet 1

INVENTORS
STUART JACKSON HUNT
MERAL CALVIN IRISH
BY Bair, Freeman
& Molinare Attys.

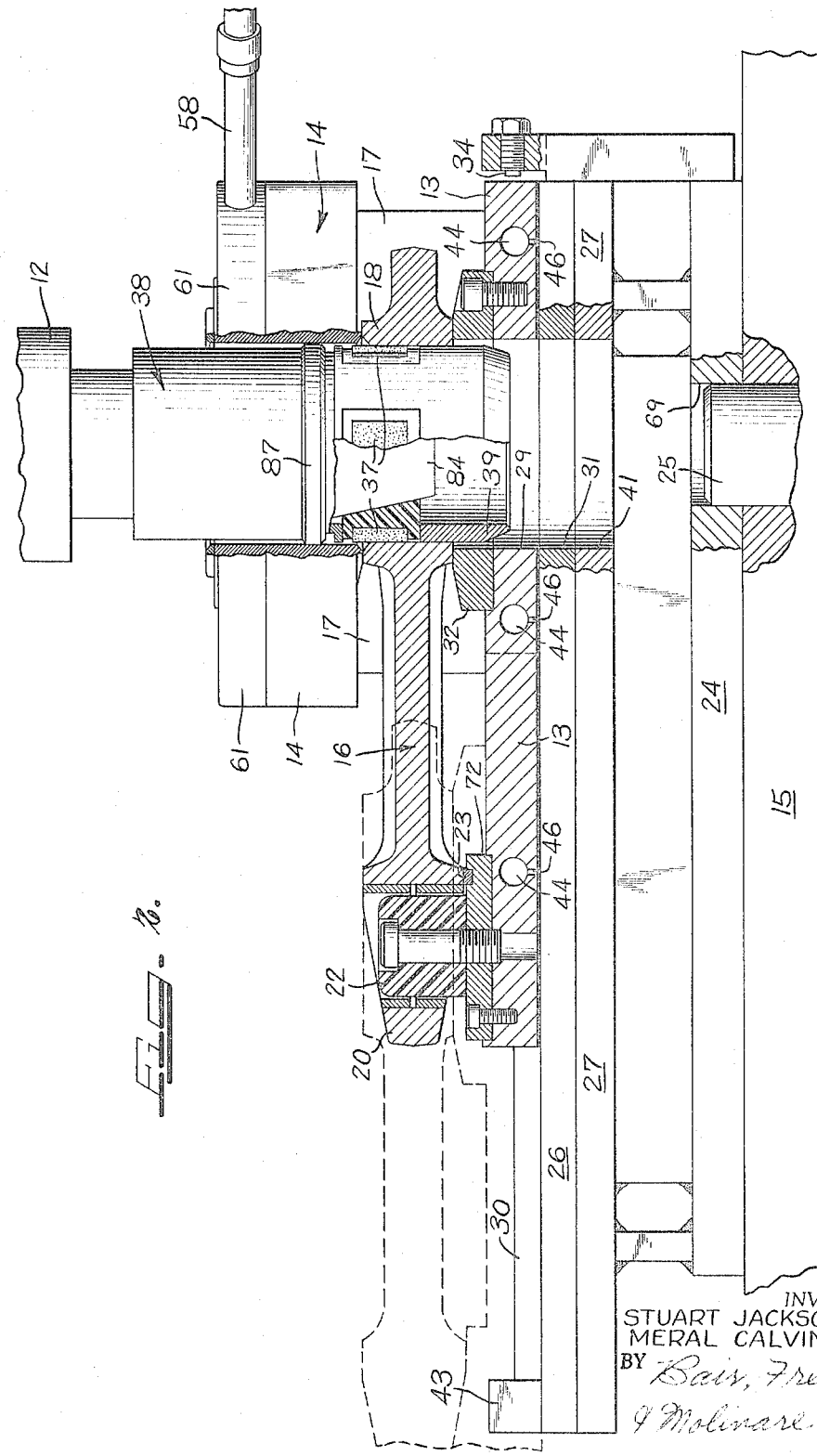

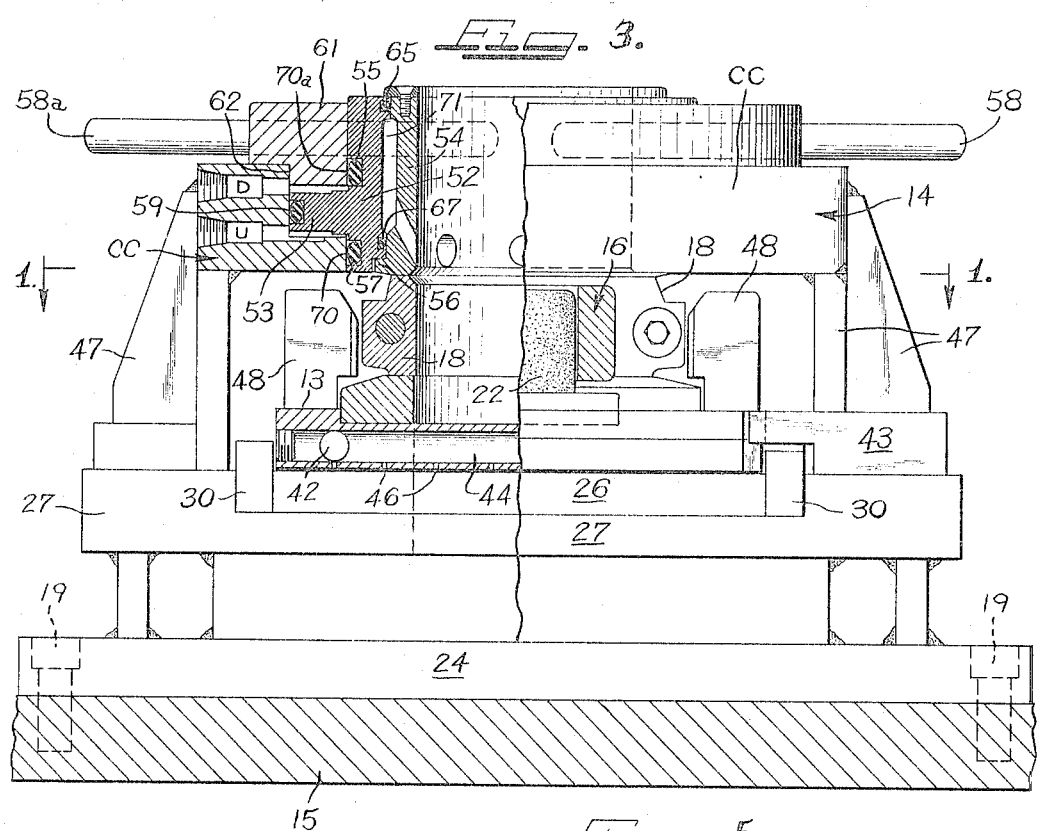
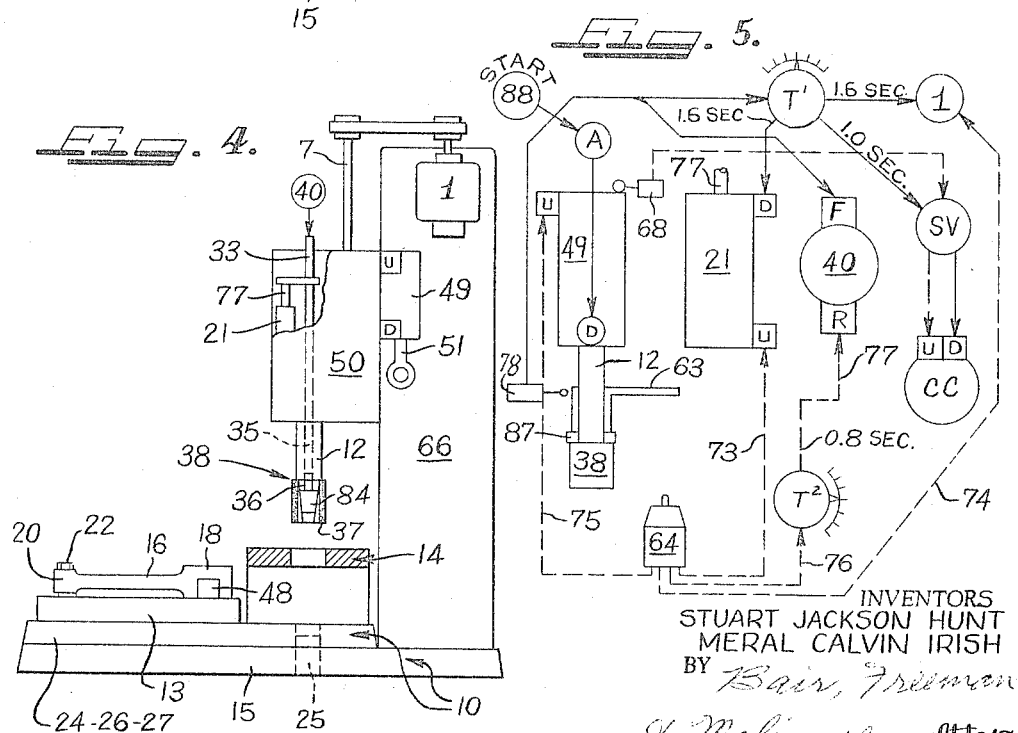

3,289,356
WORK LOCATING MEANS

Stuart Jackson Hunt and Meral Calvin Irish, Richmond, Ind., assignors to National Automatic Tool Company, Inc., Richmond, Ind., a corporation of Indiana
Filed July 20, 1964, Ser. No. 383,703
9 Claims. (Cl. 51—165)

This invention relates to work locating means wherein the work may be accurately located with respect to a honing tool or the like before the tool is operated.

One object of the invention is to provide work locating means in which a work support is floatingly mounted for ease of movement with respect to a support so that expandingstones of the honing tool may be engaged with a portion of the work to be finished before the honing tool is rotated and will move the work to an accurately aligned position with respect to the tool whereupon the work may be clamped in that position and the tool then rotated and reciprocated in the usual way to perform a honing operation on the work.

Another object is to provide work locating means for a rotating tool wherein the work may be located by the tool before it is rotated whereupon control means is operable to sequentially clamp the work in the located position and thereafter operate the tool.

A further object is to provide work locating means, and control means therefor which sequentially operates clamping means for the work after the tool has located it, operation of the tool until the finishing operation is completed, withdrawal of the tool and release of the clamp means.

With these and other objects in view, our invention consists in the construction, arrangement and combination of the various parts of our work locating means, whereby the objects above contemplated are attained, as hereinafter more fully set forth, pointed out in our claims and illustrated in detail on the accompanying drawing, wherein:

FIG. 2 is a side elevation of FIG. 1, some parts being broken away and other parts being shown in section;

FIG. 3 is a front elevation, partly in section to show details thereof, a portion of FIG. 1 being shown in section on the line 1—1 thereof;

FIG. 4 is a diagrammatic view showing our work locating means associated with a machine tool such as a vertical honing machine of the kind shown in the Calvert et al. Patent No. 3,126,672 and the Marker and Muhl Patent No. 3,126,673, and FIG. 5 is an operational diagram of control means for our work locating means and the honing machine.

Figure 1:
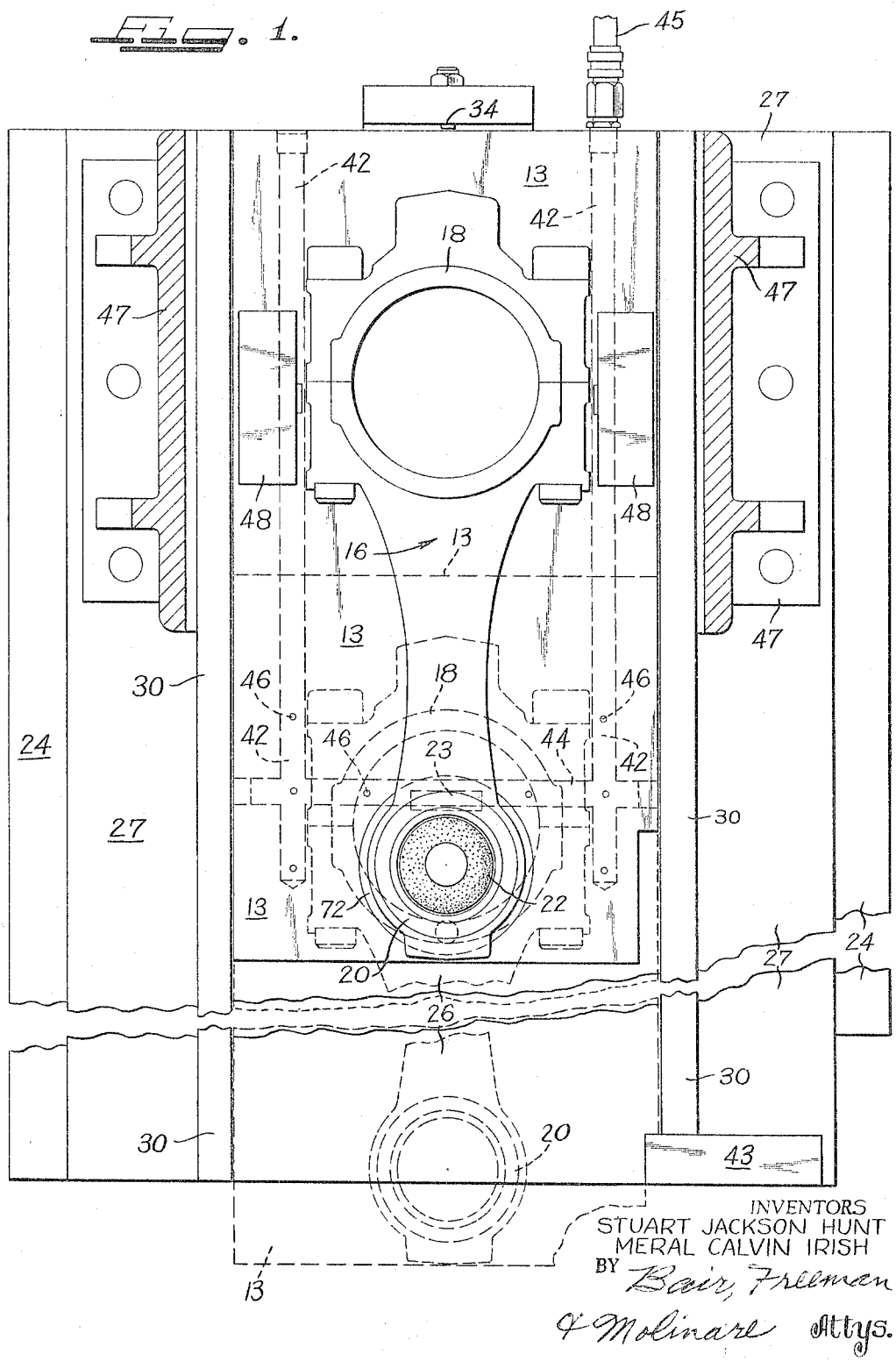
FIG. 1 is a partial plan view of the work locating means embodying our invention and showing a work piece associated therewith.

Referring first to FIG. 4, a machine tool is shown including a base 10, a work support shown generally at 13, clamp means shown generally at 14 and a work piece 16. FIG. 4 also shows certain components of the vertical honing machine disclosed in the Marker and Muhl patent which will now be referred to by the same reference numerals as appear in the patent.

A vertical column 66 has a head 50 vertically slidable thereon under the action of a head cylinder 49 and piston rod 51. A rotatable and reciprocable spindle 12 projects downwardly from the head 50 and is adapted to be rotated and reciprocated by a drive shaft 7 which in turn is rotated by a drive motor 1. A shaft 33, a rod 35 and a cone rod 36 effect longitudinal movement of a cone 84 for expanding stones 37 of a honing tool 38. Axial movement is imparted to the shaft 33 both by an air motor 40 provided for stone expansion and contraction as well as compensation for wear from cycle to cycle as disclosed in the Marker and Muhl patent, and by a piston rod 77 and a feed cylinder 21 for continuous feedout of the stones during a cycle of operation which compensates for wear during such cycle. The foregoing elements referred to in this paragraph bear the same reference numerals as in the patent and, additionally, some of these elements will be found in FIG. 5 which further includes a gauge ring 87, a torque rod 63, a limit switch 64, a start button 88, a timer T and operation indication (A) of the patent as well as certain up (U), down (D), forward (F) and reverse (R) designations for the cylinders 21 and 49 and the air motor 40 of the patent.

Returning to FIGS. 1, 2 and 3, in order to disclose specific details of the construction of our work locating means, the base 10 in FIG. 4 comprises a foundation casting 15 on which is mounted a base plate 24, a way plate 26 and a supporting plate 27 for the way plate. The work support 13 is in the form of a slide plate which slides on the way plate 26, the sides thereof being guided by side guides 30. The work piece 16 is shown as a connecting rod having a crank pin hub 18 and a piston pin hub 20. The base plate 24 is located relative to the foundation casting 15 by means of a locating plug 25 (FIG. 2) in a bore 69 of the plate 24 and cap screws 19 (FIG. 3).

The slide plate 13 and the connecting rod 16 are adapted to be selectively and alternately moved to the dotted position shown in FIGS. 1 and 2 with the slide plate against a loading stop 43 for reloading, and to the solid line position shown in full lines against a stop 34 in the position for honing the hub 18 of the connecting rod. In the latter position a bore 29 of the slide plate 13 and bores 31 and 41 of the way plate 26 and supporting plate 27 are aligned with the axis of the honing tool 38 so that it may reciprocate entirely through the bore of the crank pin hub 18 as evident in FIG. 2. A wear plate 32 of disc formation is supported on the slide plate 13 and the wear plate likewise has a bore 39 to accommodate the honing tool.

The connecting rod 16 is approximately located with respect to the slide plate 13 by a locating stud 22 for the piston pin hub 20 thereof and a pair of locators 48 adjacent opposite sides of the crank pin hub 18. Thus, a three-point locating means is provided and there is a few thousandths clearance between the locating stud 22 and the bore of the piston pin hub 20 while there is likewise a few thousandths clearance between the locators 48 and the opposite sides of the crank pin hub 18 as illustrated in FIG. 1. The hub 20 rests on a wear bar 23 of a supporting disc 72 secured to the work support 13 and the hub 18 rests on a wear disc 32 secured to the work support.

There is also clearance between the sides of the slide plate 13 and the side guides 30 and, of course, the slide plate can move longitudinally between the guides. The purpose of these clearances is to permit the slide plate 13 to be moved in any direction by the honing tool 38 during an alignment operation which is facilitated by floatingly mounting the slide plate 13 on the way plate 26. This is accomplished by means of longitudinal fluid passageways 42 and cross passageways 44 which have discharge orifices 46 downwardly to the lower surface of the slide plate. Only one of the cross passageways and a few of the discharge orifices are shown dotted in FIG. 1 wherein a supply line 45 is also shown. Either compressed air or oil under pressure may be supplied to the passageways 42 and will be discharged at the lower surface of the slide plate for floating it on air or oil as the case may be. When so floated, it takes a comparatively small force to move the slide plate in any direction relative to the way plate.

The clamp means 14 comprises a rectangular plate having a cylinder bore 70 as shown at the left side of FIG. 3 and a counterbore 62. The plate 14 is supported by brackets 47 on the supporting plate 27. A cylinder head 61 fits in the counterbore 62 and has a cylinder bore 70a complementary to the cylinder bore 70. The clamp cylinder CC is thus in the form of a ring surrounding the honing tool 38 when it is in operative position, and has down and up ports (D) and (U), respectively.

A tubular piston 52 is vertically slidable in the bore 70–70a of the clamp cylinder and has a flange 53 in the counterbore 62. A clamp ring 54 is arranged inside the tubular piston 52 and has a shoulder 56 to be engaged by the piston for moving the clamp ring 54 downwardly when the piston moves downwardly. A series of O-rings 55, 57 and 59 is provided for sealing purposes in an obvious manner.

The tubular piston 52 and the clamp ring 54 constitute a coolant receiving manifold (space 71), O-rings 65 and 67 being provided for sealing purposes, and the clamp ring is provided with coolant discharge orifices 60. Coolant lines 58 and 58a lead to and from the coolant manifold 71.

*Practical operation*

When the start button 88 is depressed (FIG. 5), operation (A) takes pace which consists of supplying air pressure to the down (D) port of the head cylinder 49 to cause the cylinder and thereby the head 50 to move downwardly relative to the stationary piston rod 51. The head 50, FIG. 4, moves from an upper load position shown in FIG. 4 to a working position with the hones 37 in the crank pin hub 18 at which time the head engages a limit switch 78. This limit switch energizes a timer $T^1$ which starts certain approximate timing periods running which are indicated by means of legends in FIG. 5. Assume the actual time for the hones to engage the work surface to be 0.8 second. When the advancing stones come into contact with the work due to operation of the motor 40, the motor stalls and the timer $T^1$ times out 0.2 second thereafter at which time a solenoid valve SV is operated to send air to the down port (D) of the clamp cylinder CC.

Thus 0.2 second after the stones have made contact with the bore of the work the clamp is operated for clamping the work in the aligned position produced by the stones expanding into contact with the bore of the hub 18 and moving it to such position if it is not quite there, made possible, of course, by the floating mounting of the work support 13. The air or oil may be supplied continuously to the supply line 45 or only at the time needed. As soon as one of the stones contacts the bore of the work, it will start pushing the work to a position of alignment and the aligning operation is completed when all the remaining stones have contacted the work. The work is now ready to be clamped.

After the clamping operation, for instance, at 1.5 seconds, the feed cylinder 21 is energized by the timer $T^1$ effecting flow of actuating fluid to the down port (D) of the feed cylinder 21, and the rotation and reciprocations of the honing tool are initiated by energizing the drive motor 1 (also at 1.6 seconds) and thereby the drive shaft 7 for both rotating and reciprocating the honing tool as disclosed in the above mentioned patent.

A suitable electric circuit is provided to accomplish the desired cycling of the head cylinder 49, feed cylinder 21 and motor 40 which are also shown diagrammatically. The timer $T^1$ and a timer $T^2$ may be time delay relays which are adjustable in setting as indicated by pointers and circumferentially spaced radial marks thereadjacent. Without going into the electric circuits and relay arrangements, FIG. 5 indicates the sequence of operation with connecting arrows for starting the honing cycle and with dotted connecting arrows for ending the honing cycle.

Assuming the honing operation ins in progress, the reciprocating mechanism stroking the hones vertically in the work and the feed mechanism 21 slowly expanding the hones at approximately the rate that they wear away, at each down stroke of the tool 38 a gauge ring 87 (FIG. 2) attempts to enter the bore of the work. Finally when the work is honed to size, the gauge ring enters the bore so that the torque arm 63 (FIG. 5) depresses the microswitch 64 to effect retraction or upward movement of the rod 77 of the feed cylinder 21 (arrow 73) by sending air to the up port (U) thereof. The electric circuit, relays and control valves for this operation, as well as the down operation of the feed cylinder 21, are, of course, designed to exhaust from the down port when the up port receives air and vice versa. Circuitry of this kind is standard equipment in the machine tool art and need not be gone into in detail.

The limit switch 64 also operates a timer $T^2$ (arrow 76) set at 0.8 second which immediately reverses the air motor 40 (arrow 77) for retracting the stones and until the timer $T^2$ times out at which time the stones 37 have assumed a position at the same diameter as when they started into the first piece of work. The stones are therefore ready for the second work piece of same dimensions which the operator positions after removing the first piece. The limit switch 64 also stops the rotation and reciprocation of the honing tool 38 by stopping the motor 1 (arrow 74) and sends air (arrow 75) to the up port (U) of the head cylinder 49 to elevate the head 50 to the loading position of FIG. 4. A limit switch 68 is actuated by the head in the up position to again actuate the solenoid valve SV, this time to send actuating fluid to the up port (U) of the clamp cylinder CC so as to release the clamp whereupon the operating cycle may be repeated after the work support 13 is loaded with another work piece.

From the foregoing specification it will be obvious that we have provided work locating means which makes it possible for the tool to accurately align a surface to be finished by the tool prior to clamping the work piece in position for being finished by the tool. The aligning operation is performed while the work is floatingly mounted and before the tool rotates, thus assuring maximum accuracy of alignment of the surface to be finished with the axis of the tool. Heretofore, the tool has been rotated during the aligning operation which tends to cause the work piece to drift in one direction out of alignment due to the torque produced by the tool on the work piece.

Some changes may be made in the construction and arrangement of the parts of our work locating means without departing from the real spirit and purpose of our invention, and it is our intention to cover by our claims any modified forms of structure or use of mechanical equivalents which may reasonably be included within their scope.

We claim as our invention:

1. Work locating means of the character disclosed, comprising a supporting base, a work support floatingly mounted thereon, clamp means carried by said supporting base and adapted to clamp work against said work support and said work support against said supporting base, a rotatable and expandable honing tool rigidly supported in relation to said supporting base and adapted to hone work on said work support when clamped by said clamp means, said honing tool expanding to provide initial engagement with the portion of the work to be honed and align it with said honing tool before said clamp means is operated and before said honing tool is rotated, and control means to sequentially expand said honing tool into engagement with the work, operate said clamp means and rotate said honing tool.

2. Work locating means in accordance with claim 1 wherein said honing tool has means to expand the hones thereof, and the portion of the work to be honed thereby is a bore with which said expansible hones cooperate to align the axis of the work bore with the axis of the honing tool.

3. Work locating means in accordance with claim 2 wherein said clamp means comprises a clamp ring surrounding the tool and engageable with the work surrounding the bore therein, a tubular piston surrounding said clamp ring and a cylinder surrounding said piston.

4. Work locating means in accordance with claim 3 wherein said tubular piston has an outwardly projecting flange, said cylinder has a counterbore receiving said flange, a pair of seals are provided between said cylinder and said piston on opposite sides of said flange and a seal is provided between said cylinder and the periphery of said flange.

5. Work locating means in accordance with claim 3 wherein said tubular piston and said clamp ring constitute a coolant receiving manifold and said clamp ring has coolant discharge orifices directed toward the tool when in the work.

6. Work locating means comprising a supporting base, a work support floatingly mounted thereon, clamp means carried by said supporting base and adapted to clamp work against said work support and said work support against said supporting base, a honing tool supported in relation to said supporting base with its axis fixed relative thereto and adapted to hone work on said work support when clamped by said clamp means, said honing tool having initial engaging means to contact the portion of the work to be honed and align it with said tool, said tool being rotatable and reciprocable during the honing operation, and means to prevent rotation and reciprocation thereof during the aligning operation.

7. Work locating means in accordance with claim 6 wherein means is provided to operate said clamp means after the aligning operation and before such rotation and reciprocation of said tool.

8. Work locating means in accordance with claim 7 wherein said tool is expansible to engage a bore of the work to be finished thereby and the expansion thereof aligns the work bore with the tool before said clamp means is operated.

9. Work locating means in accordance with claim 7 wherein means is provided to stop rotation of said tool after the honing operation has been completed.

References Cited by the Examiner
UNITED STATES PATENTS

| | | | |
|---|---|---|---|
| 1,922,246 | 8/1933 | Johnson | 51—217 X |
| 2,251,607 | 8/1941 | Astrowski et al. | 51—34 |
| 2,829,470 | 4/1958 | Johnson | 51—34 |
| 3,126,672 | 3/1964 | Calvert et al. | 51—34 |
| 3,126,673 | 3/1964 | Marker et al. | 51—34 |

LESTER M. SWINGLE, *Primary Examiner.*